(12) United States Patent
King

(10) Patent No.: US 6,205,253 B1
(45) Date of Patent: Mar. 20, 2001

(54) METHOD AND APPARATUS FOR TRANSMITTING AND UTILIZING ANALOG ENCODED INFORMATION

(75) Inventor: Larry King, Alexandria, VA (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 08/974,417

(22) Filed: Nov. 19, 1997

Related U.S. Application Data

(63) Continuation of application No. 08/699,411, filed on Aug. 19, 1996, now Pat. No. 5,802,211.

(51) Int. Cl.[7] .............................. G06K 9/36; G06K 9/46
(52) U.S. Cl. ............... 382/236; 375/240.01; 704/500
(58) Field of Search ................................ 382/236, 107;
704/500, 501, 502, 503; 348/384, 386,
396, 402, 403, 408, 409, 412, 415–418,
420, 423, 441, 407, 473; 375/240.01, 240.04

(56) References Cited

U.S. PATENT DOCUMENTS

| | | |
|---|---|---|
| 4,691,230 | 9/1987 | Kaneko . |
| 4,694,351 | 9/1987 | Nakamura et al. . |
| 4,796,087 | 1/1989 | Guichard et al. . |
| 4,816,906 | 3/1989 | Kummerfeldt et al. . |
| 4,841,575 * | 6/1989 | Welsh et al. ........................... 381/36 |
| 4,922,437 | 5/1990 | Sakata et al. . |
| 4,937,666 | 6/1990 | Yang . |
| 4,951,140 * | 8/1990 | Ueno et al. .......................... 358/136 |
| 4,992,873 * | 2/1991 | Koslov et al. ....................... 358/167 |
| 5,099,510 | 3/1992 | Blinken, Jr. et al. . |
| 5,231,484 | 7/1993 | Gonzalez et al. . |
| 5,267,334 * | 11/1994 | Normille et al. .................... 382/236 |
| 5,295,201 | 3/1994 | Yokohama . |
| 5,301,242 | 4/1994 | Gonzalez et al. . |
| 5,311,310 | 5/1994 | Jozawa et al. . |
| 5,412,738 * | 5/1995 | Brunelli et al. ..................... 382/115 |
| 5,706,367 * | 1/1998 | Kondo .................................. 382/236 |

* cited by examiner

Primary Examiner—Bhavesh Mehta
(74) Attorney, Agent, or Firm—Carter, Ledyard & Milburn

(57) ABSTRACT

Methods and apparatus for reducing the bandwidth required to transmit analog information. The analog information is converted to digital data organized in time defined blocks of information called frames. The content of a frame may be modeled as a composite of superimposed objects, which are subsets of information in the frame, that are largely unchanged frame to frame. Each object in a present frame may be represented by an identification of the object and a description of the charges in object-to-frame relationship that occurred from a previous frame to the present frame. The objects in the present frame may then be reconstructed by adjusting the objects in the previous frame in accordance with the change in object-to-frame relationships.

22 Claims, 12 Drawing Sheets

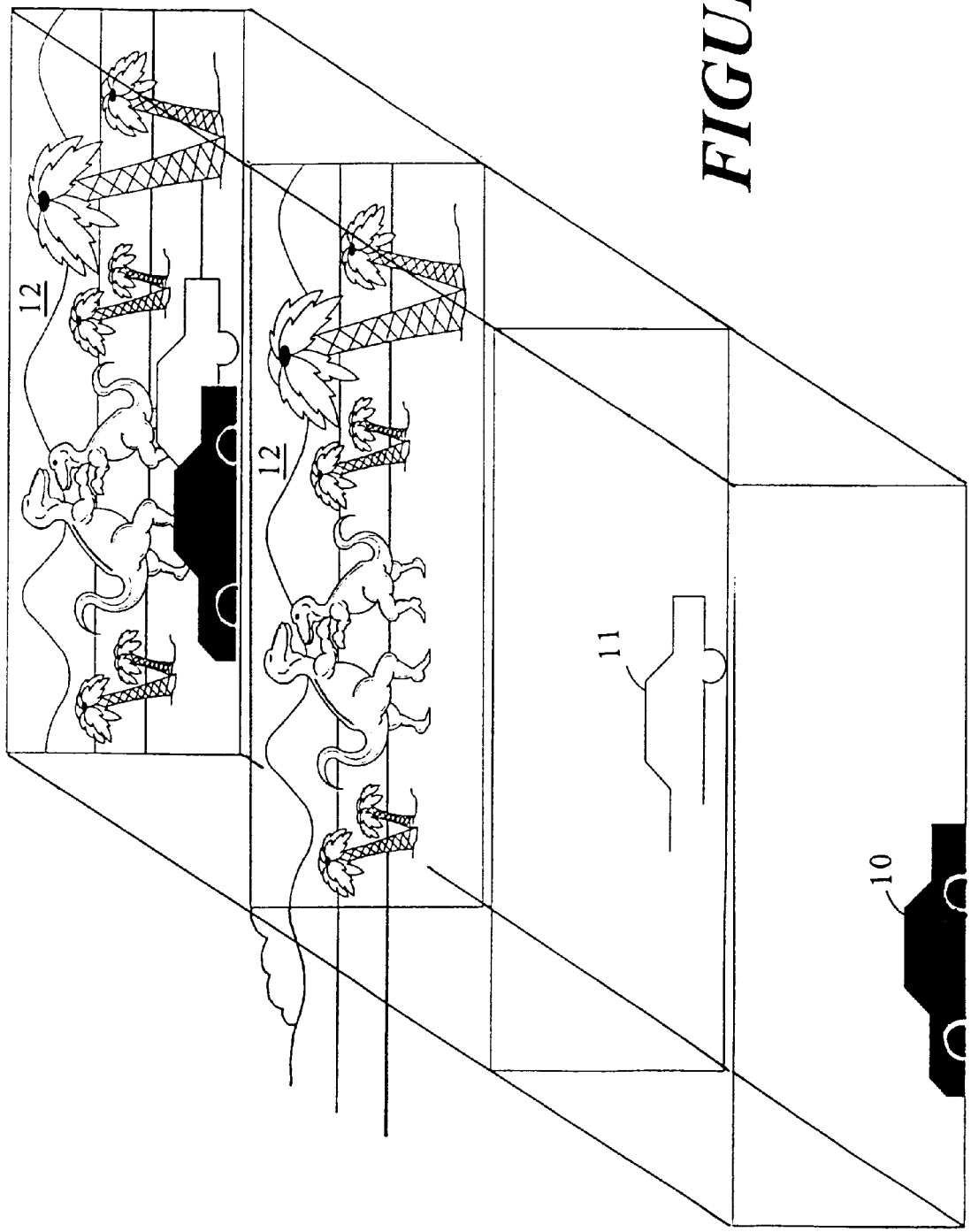

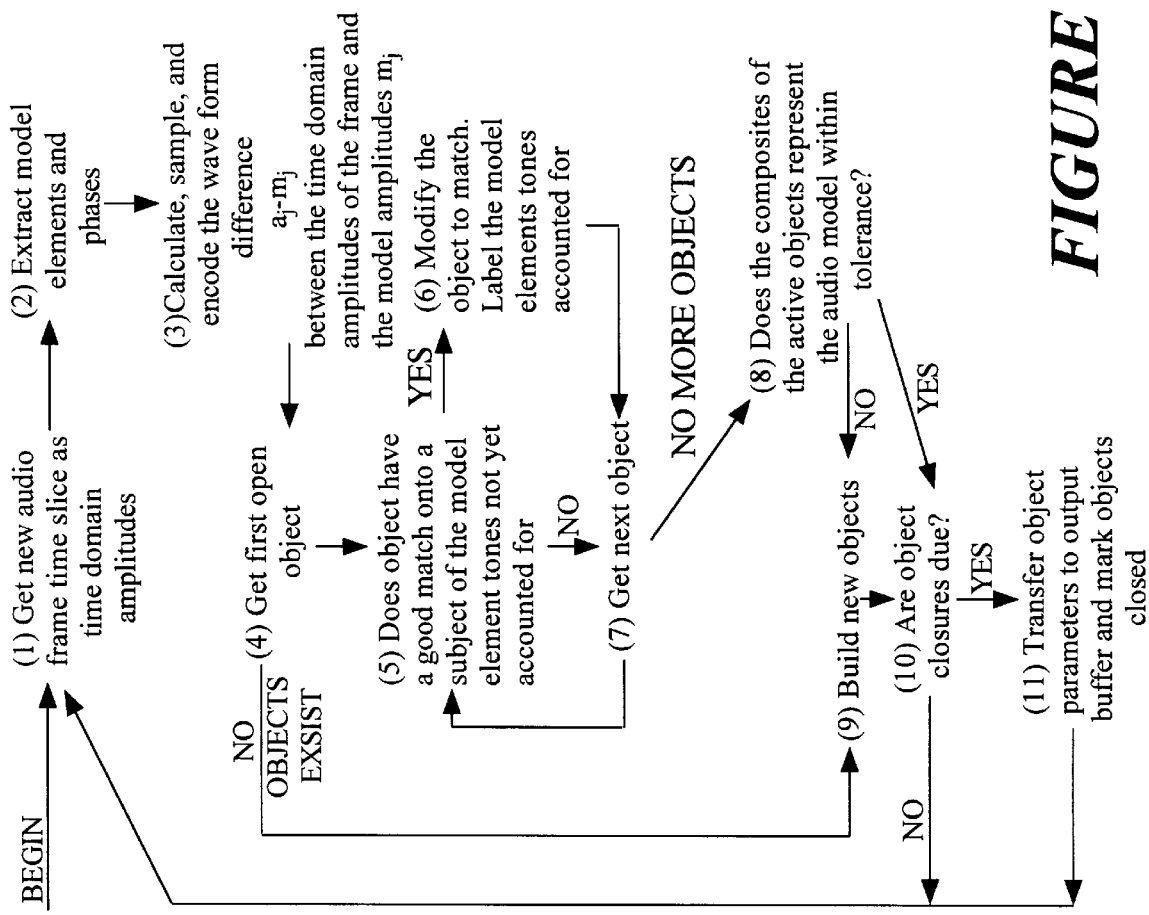

METHOD AND APPARATUS FOR TRANSMITTING AND UTILIZING ANALOG ENCODED INFORMATION

This is a continuation of application Ser. No. 08/699,411, filed Aug. 19, 1996, now U.S. Pat. No. 5,802,211.

BACKGROUND OF THE INVENTION

The present invention is related generally to the communication of information and, in particular, to methods and apparatus for the encoding and/or the decoding of analog data to reduce the bandwidth required for transmission of the data and/or to improve the usefulness of the data to a user thereof.

The communication of information from one location to another generally requires the utilization of a certain amount of bandwidth on the transmission medium. Because the bandwidth of a medium is generally fixed and limited, various systems and methods have been developed to reduce the bandwidth required for a particular type of information. For example, in video applications (generally television images), it is known to compress the moving image data by using various coding techniques to reduce the interframe and intraframe redundancy in the data. A typical visual image contains areas in which the pels (which represent the visual data) do not substantially change over a portion of the image. In such a case, the user does not need to transmit each pel separately but may transmit the data describing one of the similar pels and data describing the area over which that pel value is valid.

In a similar fashion, the set of pel values for an image region may, even if widely varied across the region, remain relatively constant over multiple occurrences of the image. Rather than repeatedly transmitting values for these pels, the data may be compressed by transmitting both the value of each pel (represented by its red, green and blue components) and a value indicating the number of occurrences of the pel values (say N). The receiver of the compressed data then reconstructs the original by expanding (or repeating) the pel values the number of times (N) indicated. In such a compression scheme, the amount of data needed to be transmitted over the medium is thus reduced by a factor of N (approximately).

Most compression techniques take advantage of the fact that the processing speed of modern computing devices is high, while the transmission speed available for data generated or processed by the devices is quite limited. The compression schemes illustrated above clearly require more Processor capability than one that merely sends the "raw" data; however, it enables the sending of more images over a given bandwidth (or the use of less bandwidth to send the same number of images) than by sending the "raw" data. Such conventional compression schemes, however, do not remove all of the data redundancy present in moving image data.

In systems which transmit intrinsically analog data in digital form, the data is often processed in successive "frames", where each frame contains the digital representation of an analog signal over a definite time interval. In most cases, there is a considerable redundancy from one frame to the next. For example, in consecutive frames in a television signal, frame content changes only where there is movement within the image scene or by the television camera itself. Successive frames are largely determinable from the immediately preceding frames. Interframe compression schemes take advantage of this redundancy to reduce the transmission bandwidth required.

For example, in one prior art system which is the subject of pending application Ser. No. 261,979, filed Jun. 17, 1994, assigned to the same assignee as the present application, bandwidth as reduced by comparing successive frames so as to transmit only changed portions. Because such a system does not re-transmit the unchanged content of previous frames, bandwidth is on average substantially reduced.

It is also known in prior art systems, described in U.S. Pat. No. 5,128,776 assigned to the same assignee as the present application, to reduce transmission bandwidth by transmitting only portions of the image which a user has identified as being of interest. For example, in a complex battlefield scene, a user may select to transmit only the changed image data in the vicinity of a particular truck or tank.

Still other prior art video systems reduce bandwidth by reducing the frequency of motion frames, from, say, the U.S. commercial standard of 30 frames per second, to as few as 2 frames per second. The chief cost of this reduction is image flicker and resulting viewer discomfort.

It is known in the prior art to attempt to smooth successive frame signals by interpolating data at a pel level on the basis of a predetermined mathematical relationship. Because moving image data has spatial dimensions as well as a temporal one, such interpolation, however, cannot accurately reflect the actual movement of the source or satisfactorily display smooth and realistic changes between frames.

Similarly to the case for video, known methods and systems of encoding for transmission of both musical and spoken audio do not exploit the recurring patterns of frequency, dispersion, and amplitude in an audio signal. In contrast to video, audio exhibits an additional anomaly related to content. A pianist may translate a score into sound at a rate of no more than a dozen notes per second, some hundred data bits of printed notation. A full second of human speech comprises only some two words, or forty bits as mapped against a dictionary. Despite these modest demands, digital audio techniques are hard pressed to support comprehensible speech or listenable music at bandwidths two orders of magnitude greater.

It is apparent that conventional video and audio compression methods and systems do not take full advantage of pattern repetitions in data and take no advantage of the primary information content of target data.

It is accordingly an object of the present invention to provide a novel system and method for transmitting data with reduced bandwidth requirements while maintaining accurate data.

It is another object of the present invention to provide a novel system and method for modeling the apparent content or time slices or frames of audio, video and other data, and transmitting data which enables reconstruction of the data from the model.

It is another object of the present invention to provide a novel system and method for communicating visual data without flicker and with reduced bandwidth requirements.

It is a further object of the present invention to provide a novel system and method for transmitting digital data in which redundant information in successive frames is reduced.

It is still another object of the present invention to provide a novel system and method for generating from a digital signal an analog signal that exhibits changes in the underlying information at interpolated times between consecutive digital frames.

It is yet a further object of the present invention to provide a novel system and method for transmitting sequential frames of digital data based on objects found within the data.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 2 illustrates the video screen shown in FIG. 1A as it is constructed from multiple objects.

FIG. 14 is a flow diagram of the decision steps or a method embodiment of the invention relating to audio encoding and transmission.

DESCRIPTION OF PREFERRED EMBODIMENTS

An exemplary method of the present invention applicable to all types of communication is initiated by the receipt of information data corresponding to a "frame" (i.e. a collection of data which is representative of an image or a sound or some other communication) to be transmitted from a transmitter to a receiver. Each frame represents the information existing during one of a sequence of time periods.

A frame of information to be transmitted (a present frame) may contain a number of data subsets, referred to as objects, which exist in substantially the same form in the present frame and a formerly transmitted frame. The objects may represent parts of an image, sounds or words in an audio signal, specific telemetry signatures, or some other elements of a communication signal. Because objects have, by definition, been formerly transmitted, data describing the objects may already be stored in memories at the transmitter and at the receiver.

Each object has a specific relationship with the frame in which it is contained, which relationship may be determined. Frame to frame, this relationship may change, and the change in the object-to-frame relationship may also be determined. Accordingly, objects in the present frame may be represented by the combination of (1) data identifications of the objects in a formerly transmitted frame, and (2) the change in the object-to-frame relationship between the formerly transmitted frame and the present frame. The object identifications and the change in object-to-frame relationships may then be combined with descriptions of the objects already stored at the receiver to reconstruct each object in the present frame.

Some frames may include portions of information that were not present in a previously transmitted frame, i.e. future objects not yet stored at the receiver. Data corresponding to these portions of information may be transmitted in its entirety to the receiver. These portions of information may thereafter be stored at the transmitter and the receiver so that they are available as objects in subsequently transmitted frames. Collectively, these portions of information and the objects represent an entire frame of information, e.g., an image, a voice phoneme, or block of telemetry. Reconstruction of the present frame may be accomplished by integrating all the individually reconstructed objects and the portions of information corresponding to future objects.

Image Encoding

A preferred method embodiment of the invention is directed to the transmission of image data. Broadly, the method includes the steps of encoding and transmitting partial images, or objects, which collectively represent part or all of a video frame, and receiving, decoding and integrating the objects.

Figure 1A:
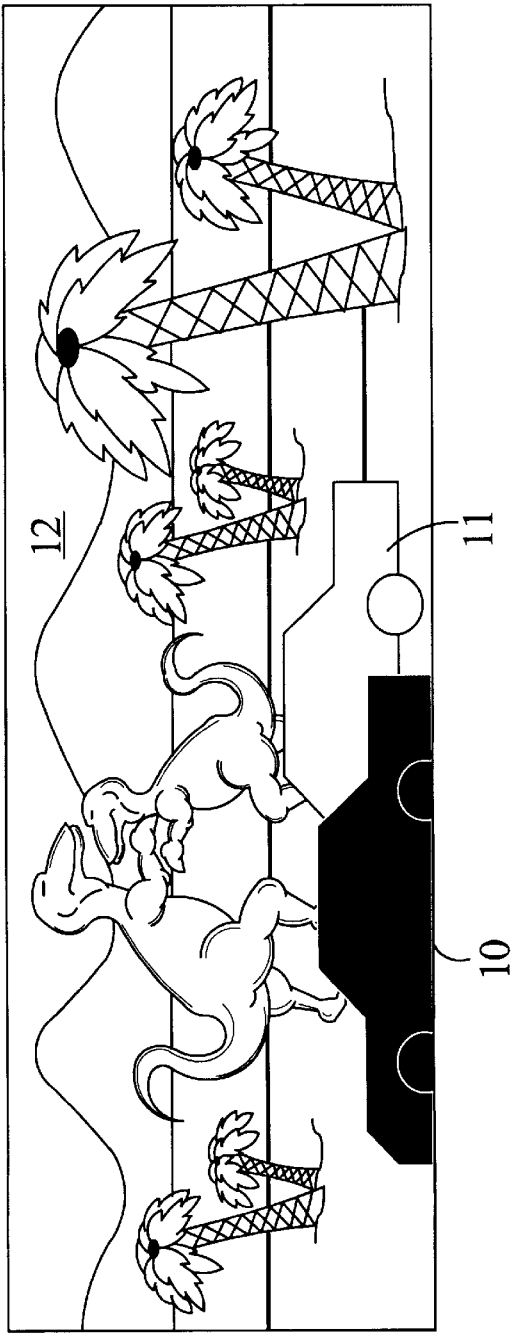
FIG. 1A is an example of a video frame containing a first image.
Figure 1B:
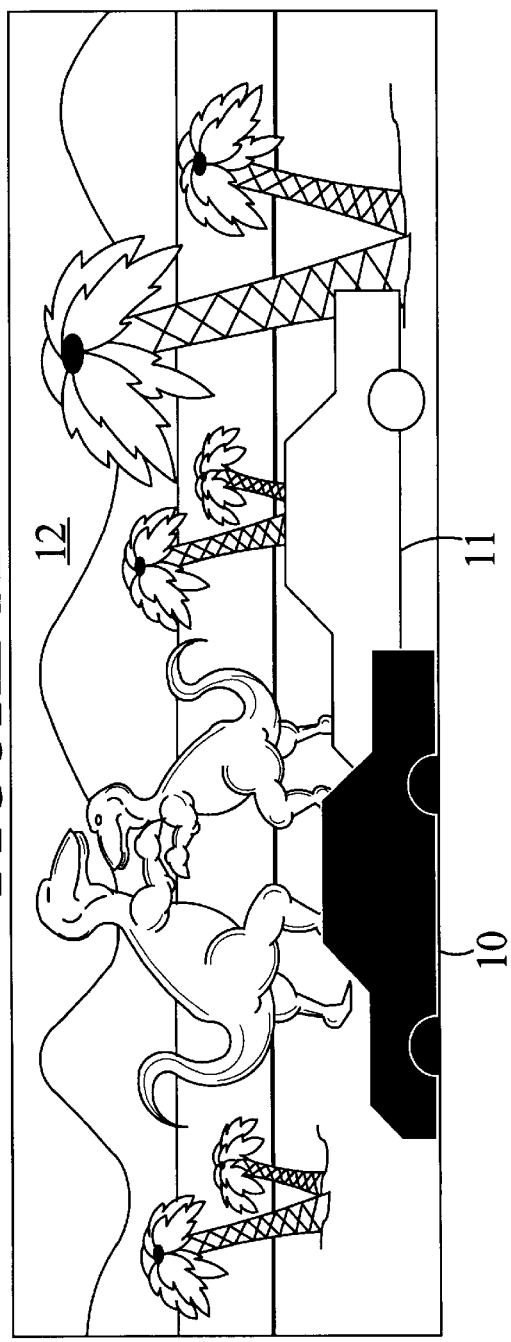
FIG. 1B is an example of a video frame containing a second image.

Over time, a video image is comprised of a sequence of frames, such as those shown in FIGS. 1A and 1B. Each frame is individually made up of one or more objects, such as a dark car 10, a light car 11, and a dinosaur background 12.

With reference to FIG. 2, each object is a set of picture elements, or pels having, at a given time, specific (x,y) locations with respect to the screen. Each pel may possess an opaque luminance and chrominance or may be transparent. The transparent pels in an object allow opaque pels from underlying objects to show through and be visible after all the objects are layered on top of one another from background to foreground. Note that individual objects need not span the entire screen. Objects may overlap the screen edges, as does the dinosaurs background object here, may move entirely off screen, and may be or arbitrary size.

Frame-to-frame, some objects, such as the dark car 10 and the light car 11, change or move with respect to other objects, such as the dinosaur background 12, as illustrated by the sequence of FIGS. 1A and 1B. The encoding process requires the determination of these changes and movements.

Figure 3:
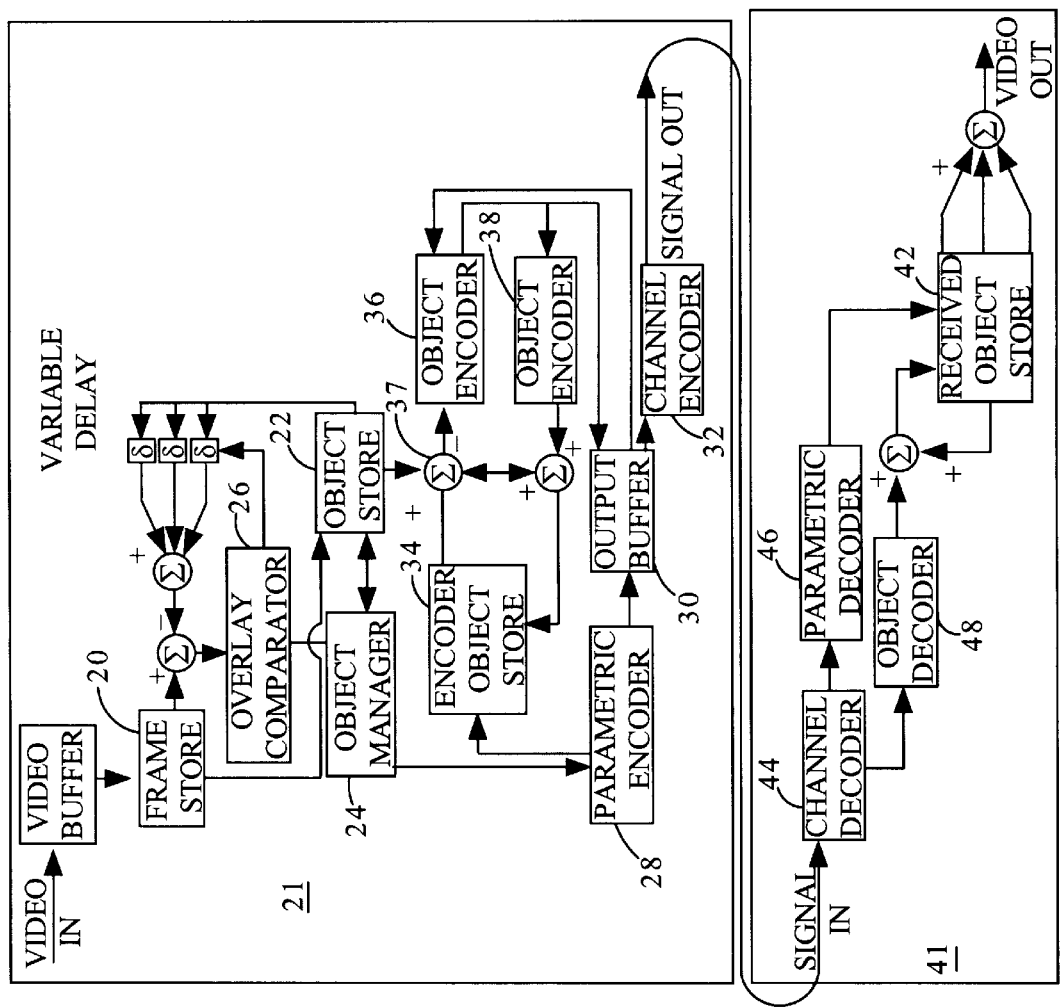
FIG. 3 is a block diagram of a video transmitter/receiver system of an embodiment of the invention.

With reference to FIG. 3, the present method for identifying, maintaining and moving motion video objects, may be initiated by the storing of data representing a video frame in a buffered FRAME STORE 20 contained in a transmitter 21. The data representing the initial video frame is also stored as a single object in an OBJECT STORE 22, implemented by memory in the transmitter 21, and in a RECEIVED OBJECT STORE 42, also implemented by memory in a receiver 41. After the present method has been iterated, the video frame may come to be comprised or a number of objects layered background to foreground, such as the dark car 10, light car 11, and the dinosaurs background 12 shown in FIG. 2. Each individual object may be stored in the OBJECT STORE and the RECEIVED OBJECT STORE.

Encoding information representing objects, such as the dark car 10 in FIG. 1B, may be accomplished by first determining the change between a present frame and the object as it appears in one or more former frames and determining the relationship of the object to the present frame. Since data representing the dark car 10 in the former frame may already be stored at the receiver (in the RECEIVED OBJECT STORE 42), all that need be transmitted to reproduce the image of the car in a present frame is the change in object-to-frame relationship for the car and an identification of the car as the object to which the change information corresponds. The object change information may then be combined with the data representing the car stored at the receiver to reconstruct the object in the present frame.

Figure 4:
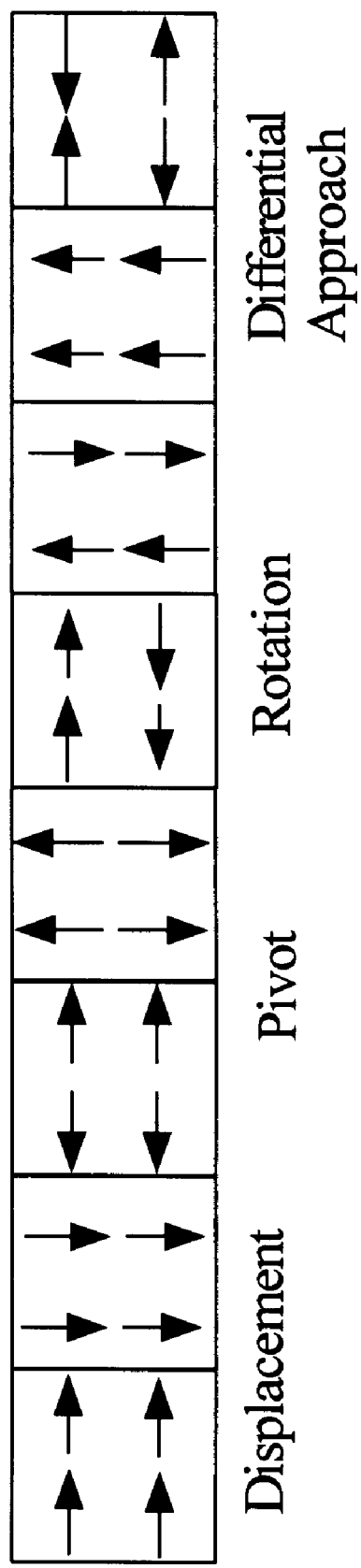
FIG. 4 illustrates four types of position change which may be experienced by an object.

With renewed reference to FIG. 3, the determination of change in object-to-frame relationship may be started by an OBJECT MANAGER 24, which may be implemented by a programmable processor. The OBJECT MANAGER 24 determines a best approximation of the changes in positions of the objects in the OBJECT STORE 22 between the former frame and the present frame. A position change is illustrated by the change between FIGS. 1A and 1B where the dark car 10 and the light car 11 have moved within the frame from one frame to the next. The position changes for objects greater than a predetermined size may be more specifically approximated by identifying changes in object displacement, pivot, rotation and differential approach, shown in FIG. 4. All of the aforementioned changes may collectively be referred to as parametric changes for an object.

Figure 5:
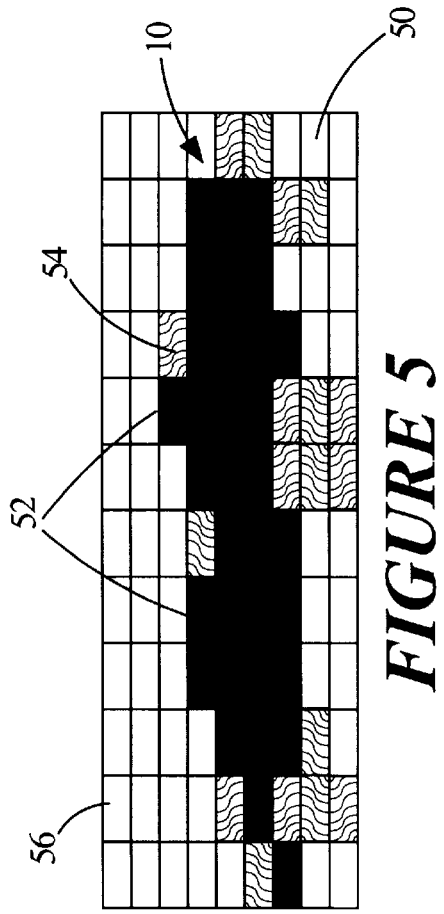
FIG. 5 is a tile representation of a portion of the cars object shown in FIGS. 1A and 1B.

The best approximations of position change are determined by the OBJECT MANAGER first dividing a stored object, such as the cars 10 in FIG. 1A, into a number of rectangular tiles 50 shown in FIG. 5. Collectively the tiles corresponding to an object span the entire visible area of the frame, each tile containing some number of opaque or transparent pels. Tiles may be any number of pels on a side, the tiles 50 being 8×4 pels (x,y) for example. Also, the tiles need not all be the same size or shape, and need not be rectangular but may be any convenient shape.

Next, the OBJECT MANAGER iteratively assumes motion vectors for each tile in the object to determine the motion vector which best describes the parametric change for the tile between the former frame and the present frame. In an alternative embodiment, motion vectors may be determined for each pel in an object rather than for tiles, thereby avoiding the step of dividing objects into tiles.

The determination of the best description of the parametric changes may be based on one of two formulas, or some hybrid of the formulas. The first formula is based on a least squares match, or the smallest sum of squares of differences of pel luminances and/or chrominances. With reference to FIG. 3, a possible motion vector is selected by the OBJECT MANAGER 24, and the visible pels of an object tile from a former frame are displaced by the motion vector. Pels are visible only if, for the given displacement, they are on screen and not covered by a previously allocated opaque foreground pel from another object tile. The displaced pels are compared by an OVERLAY COMPARATOR 26 with pels in the present frame stored in the FRAME STORE 20 having the same coordinates. The process of selecting possible motion vectors and comparing pels is repeated in order to determine the motion vector which produces the smallest sum of squares of differences of pel luminances and/or chrominances.

An alternative formula is based on a very good match of some of the pels in a tile without regard for extremely poor match of other pels in the tile. The process of selecting possible motion vectors and comparing pels is the same as recited above. The determination of the motion vector which produces the best approximation of the parametric changes to the tile however, is driven by the very close match of some of the pels rather than the least squares match.

To carry out the pel comparisons, the OVERLAY COMPARATOR compares the displaced visible pels of the object tiles (derived from image data of one or more former frames) with the pels of the present frame for each pel coordinate in the frame. Pel comparison may be carried out by first determining if the two pels at a coordinate have matching luminances within a preset margin. Pels that do not match may then be compared for matching chrominances within a preset margin. The OVERLAY COMPARATOR 26 may be implemented in logic circuitry, multiple programmable processors, or by other means.

A statistical measure, based on one of the two above formulas or some hybrid of them, of the closeness of match of the pels for each tile in the object is calculated by the OVERLAY COMPARATOR and stored by the OBJECT MANAGER with other object data in the OBJECT STORE. The best statistical measure corresponds to the motion vector which best describes the parametric changes to the tile. If the best statistical measure for a tile is not better than some predetermined value, however, no motion vector is determined and the tile will play no part in determining object transformations.

FIG. 5 shows a portion of the tile map of the dark car 10 and the light car 11 in FIG. 1A which resulted from the motion vectors having the best statistical measure. The solid shaded tiles 52 represent tiles for which a motion vector was determined, the wavy-line shaded tiles 54 represent tiles for which no motion vector was determined, and the empty tiles 56 represent tiles having transparent pels.

After determining the best motion vectors (which correspond to the best displacements) for all the tiles, each tile may be averaged with its neighboring tiles. Averaging is conducted if a candidate tile has an imperfect displacement (statistical distance too large), or the tile has a non-unique displacement, and neighboring tiles have a statistical match as good as or better than the candidate. Each tile displacement is averaged with the best tile displacements of nearby tiles by selecting a median value for the tile displacements. The process may be iterated, to arrive at final title displacements based on the best title displacement of each tile, selecting neighbor tiles as a better match based on average statistical distance. Neighboring tiles to a particular tile, may or may not be limited to those tiles in the immediate vicinity (e.g. 8 tiles) surrounding the tile.

An alternative averaging process is to assign the motion vector which produces a better statistical match for a candidate tile, selected from the best motion vectors of neighboring tiles.

Following the determination of the motion vectors for an object, the OBJECT MANAGER generates a set of object transformations which describe the parametric changes to the object as a whole so as to match or approximate the collective changes to the individual tiles which where designated as being in the object. The object transformations may be generated by trial and error or by mathematical inversion of the best approximation of the parametric changes to the tiles. All tiles may not be treated equally in their influence on the determination of the object transformation. Tile influence may be weighted based on the number of visible pels in the tile and/or on the statistical closeness of match for the tile.

The object transformations may be of the form:

$$x'=x+dx \text{ and } y'=y+dy.$$

where (x',y') is the position of a pel in the present frame, and (x,y) is the position of the same pel in the former frame. The terms dx and dy represent the x, y motion vectors for the pel between the two frames.

The object transformations also include a parameter governing the modification of object depth placement. In order to determine the depth placement of each of the objects in the present frame, the subset of overlapping pel locations for each two of the objects is identified by the OBJECT MANAGER. For each of the overlapping pel locations, the pel values for the two objects are compared by the OVERLAY COMPARATOR with the pel values of the present frame for luminance and/or chrominance match. The object having the higher percentage of matching pels with the present frame is in the foreground relative to the other object. This pel comparison may be repeated as necessary until the depth placement of each of the objects relative to the other objects in the frame is determined and included in the corresponding object transformations.

Once an object transformation is determined, it is applied by the OBJECT MANAGER to the individual tiles in the stored object to estimate its accuracy in describing the motion of the object. Transformation accuracy is measured by comparing the pels of an object tile displaced in accordance with the object transformation applied to the weighted center of each tile to determine the tile displacement, with the pels of the tile in the present frame having the same coordinates as those resulting from the displacement. The pel comparisons are carried out by the OVERLAY COMPARATOR for luminance and/or chrominance match which exceeds a predetermined limit. If groups of tiles within the object are poorly matched the object may be split into two groups of tiles, each group defining a potential new object.

The matching of pels, tiles or objects may be based on absolute luminance difference, absolute chrominance difference, relative luminance or chrominance differences or correlations; the number of close matches, the sum, average, weighted average, or other mathematical summarization of individual absolute or relative differences, or a combined weighting of absolute and relative differences or correlations.

Upon the determination of sufficiently accurate object transformations (i.e. object transformations for which the pel matching exceeds the predetermined limit), the transformations and corresponding object identifications may be sent to a PARAMETRIC ENCODER 28 shown in FIG. 3. The object transformations and identifications are encoded by the PARAMETRIC ENCODER and applied therefrom through an OUTPUT BUFFER 30 to a CHANNEL ENCODER 32 for transmission to the receiver 41.

The transformations and identifications are received at a CHANNEL DECODER 44, which applies the transformations and identifications to a PARAMETRIC DECODER 46. The decoded transformations and identifications are thereafter applied to the RECEIVED OBJECT STORE 42 which reconstructs the objects in the present frame by applying the object transformations to the correspondingly identified objects stored in the RECEIVED OBJECT STORE 42.

Parametric object transformations are applied to pels in consistent order from left to right, and from top to bottom. If two or more pels are transformed to the same location, the last pel to be transformed to a location is assigned the location. Transformed pels may also have positions outside the visible frame but within the screen dimensions.

In transforming pel locations (x,y), the locations are rounded to the nearest integer location (x',y') before being stored as part of an object. If, however, for two consecutive rounded locations (x1,y1) and (x2,y2) in a row, $$|x1'-x2'|+|y1'-y2'|>1$$

then an additional pel location (x",y") may be computed, where $$x''=(x1+x2)/2 \text{ and } y''=(y1+y2)/2.$$

If (x",y") is different than (x1',y1') or (x2',y2') then the pel location (x",y") is also stored as part of the transformed object. Accordingly, some of the pel locations (x,y) may produce two different pel locations (x',y') and (x",y") in the transformed object.

The object transformations and identifications are also applied by the PARAMETRIC ENCODER 28 to the ENCODED OBJECT STORE 34. The ENCODED OBJECT STORE stores reconstructed versions of the objects of the present frame by applying the object transformations and identifications to the objects of the former frame and storing the resulting objects. Accordingly, the ENCODED OBJECT STORE 34 contains the same information as the RECEIVED OBJECT STORE 42.

Figure 6:
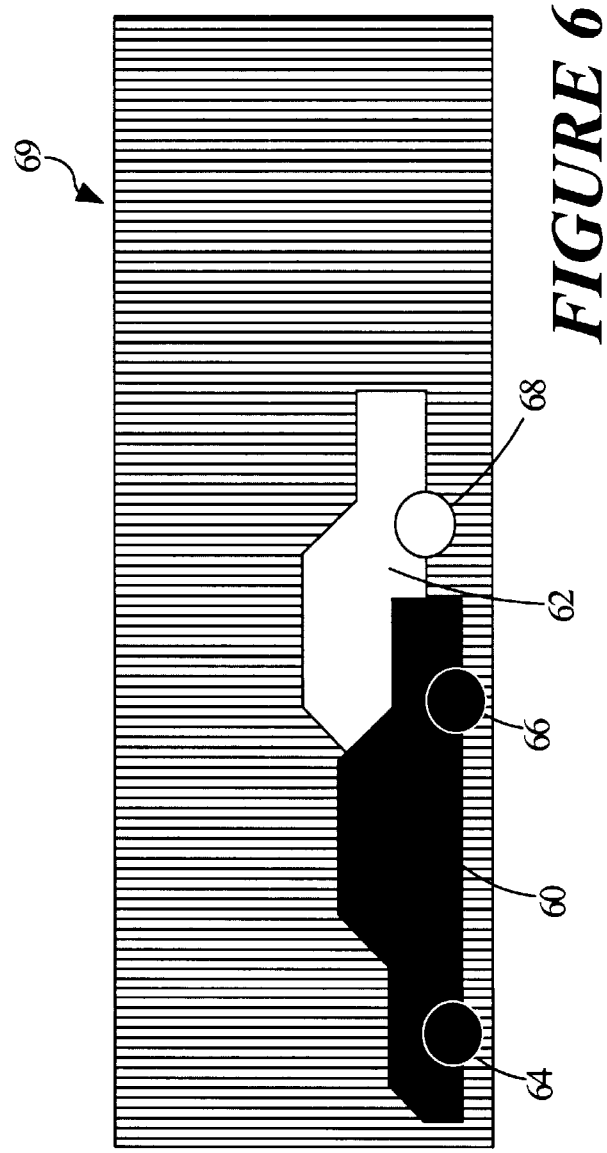
FIG. 6 illustrates the division of a full screen object in FIG. 1A into six new objects derived from FIG. 1B data.

With regard to the creation of new objects from existing ones, FIG. 6 shows that the cars 10 and 11 of FIG. 1A, may become separated into individual new objects of a first car body 60, a second car body 62, first, second and third rotating wheels, 64, 66 and 68, and distinct from background 69 in a frame having two moving cars. For each potential new object, motion vectors for component tiles may be determined, and a separate object transformation generated for each object. The process of applying object transformations to the tiles in the objects and comparing pels may then be repeated for the new objects and their associated object transformations. The identification of potential new objects and the attempt to determine their respective object transformations may continue until all the possible new objects and transformations are determined.

For those objects which have been split into new objects, a determination is made as to which new object the pels in the original object should belong. This determination may be made by applying object transformations for the new objects to the pels of the former frame and identifying which transformation produces a better match with the pels in the present frame having the same frame coordinates. The pels are compared for matching luminances within a preset margin and assigned to the object having the transformation that brought about the match. Pels that are not matched are then compared for matching chrominances within a preset margin and if a match occurs the appropriate assignment may be made. The comparison of luminances and chrominances may be repeated for those pels which did not match initially, increasing the preset margins each time the comparisons are repeated. The determination of pel match may also include a factor related to the matching of pels at one or more adjacent coordinates to that of the pels being compared. The pel comparisons should be repeated until all the pels are assigned to one of the new objects. After the new objects are defined by the assignment of pels and stored individually in the OBJECT STORE for use as objects in subsequent frames, the original object may be deleted from the OBJECT STORE.

In addition to the present frame containing objects and new objects created from the splitting of old objects, there may be a subset of pets with x-y coordinates not included in the visible portion of any object or with luminance/ chrominance values that are not within a predetermined range of the values of the visible object pels. These pels may be stored as a future object in the OBJECT STORE 22, FIG. 3. For example, with reference to FIG. 7, it may be seen that the rear portion 70 of the background car 72 was obscured by the foreground car 74 in some number of previous frames. If the rear portion 70 or the combination of the rear portion 70 and the background car 72 are not identified as an object, the group of pels in rear portion 70 may be stored as a future object.

With reference to FIG. 3, the encoding of data representing future objects may be carried out by an OBJECT ENCODER 36. In order to encode data representing future objects, the OBJECT ENCODER receives stored data from the OBJECT STORE 22, encodes the data, and sends the data to the OUTPUT BUFFER 30 for transmission to the receiver 41.

The OBJECT ENCODER 36 may also periodically encode data representing present objects to update the ENCODED OBJECT STORE 34 and the RECEIVED OBJECT STORE 42. This periodic updating may be required in order to correct for differences between the object as constructed from parametric change information and the object as it actually appears in a frame, which arise from actual frame by frame changes or from the repeated use of parametric change information to describe the object. When updating, the OBJECT ENCODER 36 receives difference information from a summer 37 regarding an object stored in the OBJECT STORE 22 and the ENCODED OBJECT STORE 34, as well as a percent-full indicator from the OUTPUT BUFFER 30, throttling the encoded data rate so as to match the communications bandwidth. Based on the received information, the OBJECT ENCODER encodes difference data representing the object in the present frame and sends the data to an OBJECT DECODER 38, and to the OUTPUT BUFFER 30 for transmission to the receiver. The OBJECT DECODER 38 decodes the same difference data and sums to the ENCODED OBJECT STORE 34 an exact replica of encoded/decoded data stored at the receiver in the RECEIVED OBJECT STORE.

The encoded data output from the OBJECT ENCODER 36 describes, to the precision possible with the available bandwidth, each of the pels in the object or region of a frame to which the data corresponds. The entire image will be transmitted by normal differential encoding and transform methods, but the encoding is not of the frame as a whole, but of distinct jig-saw pieces of it, each piece associated with a particular object and subject to independent manipulation in subsequent frames. Appropriate conventional techniques may include the steps of discrete cosine transform, integer divide, and run-length encoding. After transmission to the receiver 41, the encoded data is sent to a receiver OBJECT DECODER 48, which decodes the data for storage as an object in the RECEIVED OBJECT STORE 42 and for conversion into opaque pels in an image.

Figure 7:
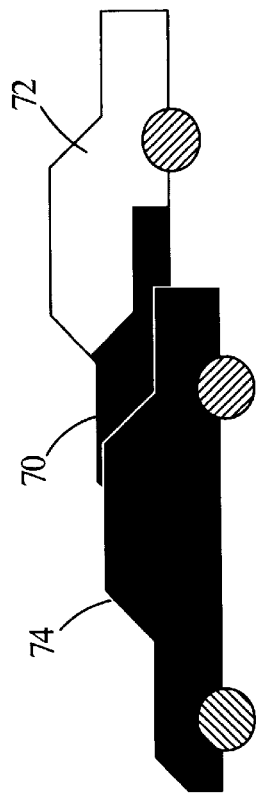
FIG. 7 illustrates the creation of a future object as the result of relative motion between the cars in FIGS. 1A and 1B.

With renewed reference to FIG. 7, objects such as rear portion 70 and background car 72 may be merged together into one object if the two objects have a common object transformation over some period of time. If like-moving objects are found, they are merged by the OBJECT MANAGER into one object.

Object merger is accomplished by calculating the overall combined object limits and transferring combined pel luminosities and chrominosities to one of the objects for storage as a single object. The other object is deleted from the OBJECT STORE memory and a parametric command is sent to the PARAMETRIC ENCODER to force deletion from the ENCODED OBJECT STORE and RECEIVED OBJECT STORE memories. Objects which have not appeared in some predetermined number of consecutive frames may also be deleted from the OBJECT STORE, and by parametric command deleted from the ENCODED OBJECT STORE and RECEIVED OBJECT STORE memories.

In addition to the foregoing, there are several "housekeeping" duties associated with object-based encoding. The present method allows, for example, objects of arbitrary size (objects larger or smaller than the screen). This freedom has particular significance in wide-area pan scenarios (e.g., fixed area surveillance) in that it allows essentially zero-bandwidth compression or an uneventful sweep. There must be some limit to object size however. For example, in the case of the encoding of a continuous image of street traffic, a single object of tremendous size may be built up from the uniform movement of cars in one direction across the screen, almost all of the object being off screen. Routine housekeeping controls the build up of such objects and performs other tasks.

Housekeeping includes examining the object queue for objects with at least some pels that are off screen. An object extending more than some predetermined number of maximum pels off the visible screen in any coordinate direction may be trimmed to extend only the maximum number of pels off screen.

The object queue may also be examined for objects that have been absent from the visible screen for more than a predetermined number of frames in order to delete the objects from the queue. The potential benefit of delaying deletion of objects must be balanced against the costs of additional processing and storage overhead. For example, useful objects that may exist from much earlier frames include recurring states of existing physical objects (as in the red, yellow and green phases of a traffic light), as well as physical objects that repeatedly enter and leave the frame.

Figure 8:
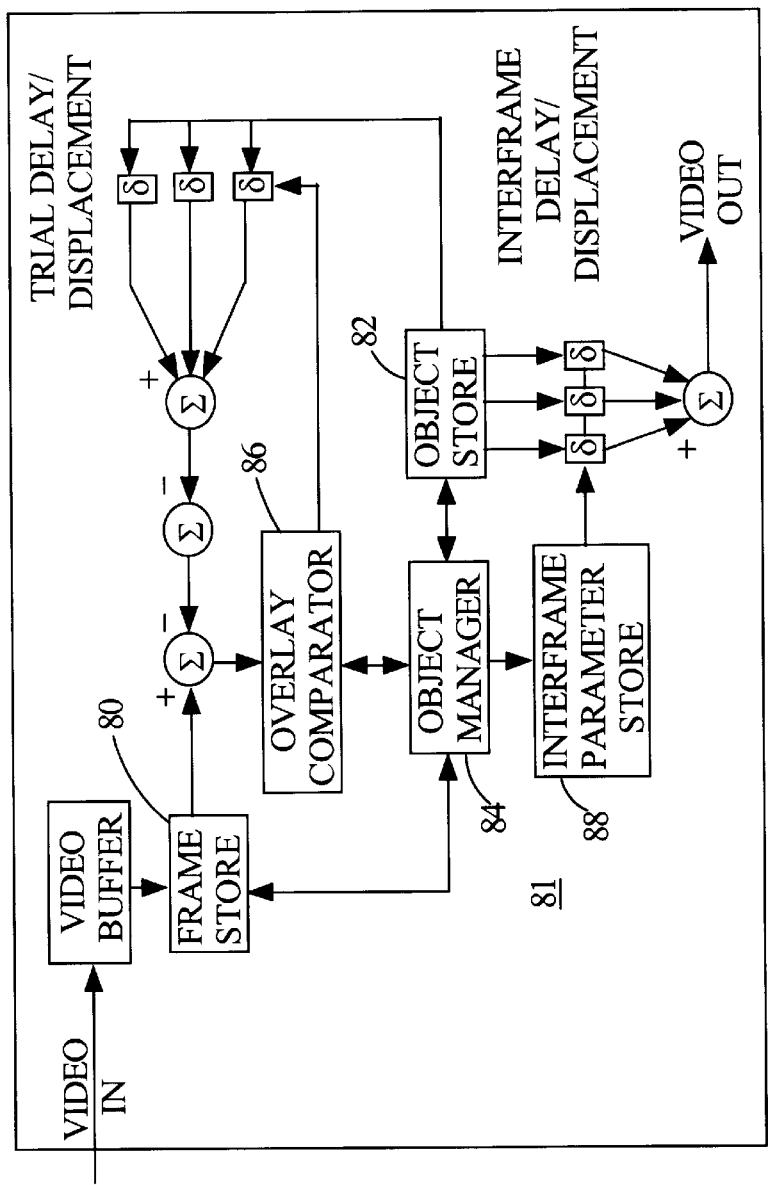
FIG. 8 is a block diagram of a video receiver system of an embodiment of the invention.

An alternative method of the invention is to identify objects in video frames only at a receiver. Video frames may, for example, be received at a receiver as few as 2 to 10 times per second, creating noticeable flicker in the image over time. With reference to FIG. 8, flicker may be reduced or eliminated by capturing two consecutive video frames in a FRAME STORE 80 at a receiver 81. As in the previously described embodiment, an OBJECT STORE 82, an OBJECT MANAGER 84 and an OVERLAY COMPARATOR 86 may be used to identify objects in the frames and determine interframe object transformations which describe the state of the objects at multiple intervals between the frames. The object transformations may be stored at an INTERFRAME PARAMETER STORE 88 and combined with information in the OBJECT STORE 82 to generate one or more interframes which represent intermediate states of the image between the times of two actually received frames. Flicker in the image may be reduced due to the production of the interframes at the receiver between the actually received frames. The implementation of this method does require however that the image be viewed at a slight delay beyond the received frame interval, to allow for the capture of sequential frames before the generation of the interframes.

Figure 9:
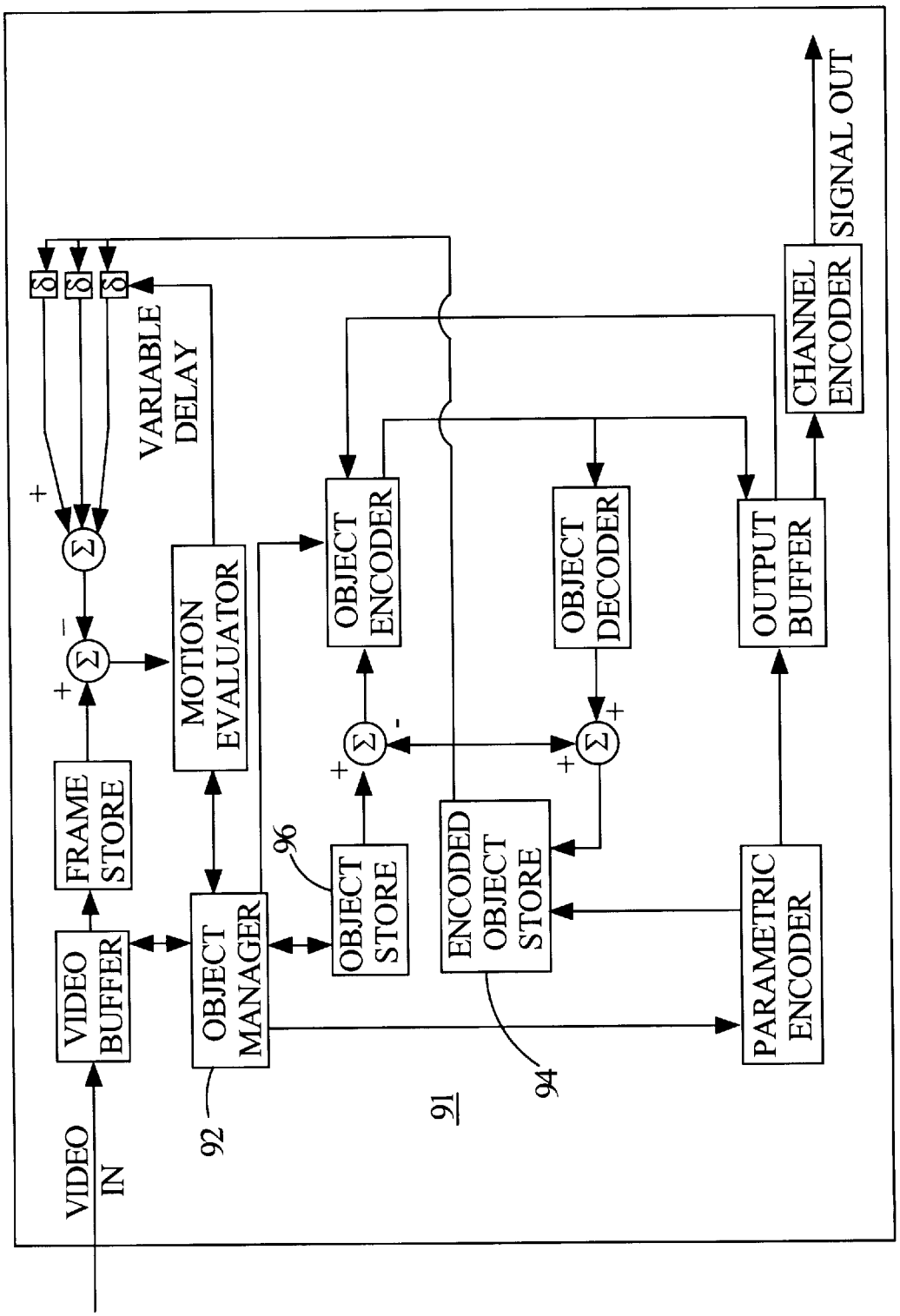
FIG. 9 is a block diagram of a video transmitter system of an embodiment of the invention.

With reference to FIG. 9, an alternative configuration of a transmitter 91 for carrying out a method of the invention is shown. In the transmitter 91, an OBJECT MANAGER 92 determines parametric change information for encoded objects stored in an ENCODED OBJECT STORE 94, rather than for objects stored in an OBJECT STORE 96. The parametric change information may also be determined for a combination of the objects in the ENCODED OBJECT STORE 94 and the OBJECT STORE 96. This method produces objects less well matched to the original images, but may track them better and converge more rapidly on changes.

Audio Encoding

Another embodiment of the present invention relates to the encoding and decoding of audio information to reduce the bandwidth required to transmit the information. Broadly, audio information for some time period may be encoded by modeling the information content of an analog signal for the period with some number of superimposed, digital signals which collectively approximate the analog signal. The digital signals may be reproduced at a receiver by applying signal change information to digital signals previously stored at the receiver rather than from data which describes the digital signals in full.

Like a video signal, an audio signal may be comprised of a sequence of information frames which communicate information over time. Unlike video frames however, a frame of audio information does not represent the state of the information for an "instant", but instead represents the information over a finite time slice, typically 0.01 to 0.1 seconds, spanning from some ten to a thousand consecutive sampled times. Each frame of audio information may itself be represented by some number of superimposed objects (wave forms) which collectively approximate the analog signal in the frame. Each object, in turn, may be described by digital parameters which model the analog signal.

Objects may be initialized in a previous frame by applying the digital signal of one frame to a content model, extracting the content elements of the signal, and storing the elements as initial objects. The objects which describe a present frame may be related to objects in a previous frame by some set of model parameters which describe the changes to the objects between the frames. The model parameters may be based on tones, speech or some composite of the two. In a tone based model the parameters which describe the objects may include attack and decay times, and signal frequency, amplitude, dispersion and phase. Alternatively, a speech based model may use base vocal frequency, amplitude, dispersion, phase or alternative noise driver parameters, and first, second and third response filter frequencies and relative amplitudes to describe objects.

Figure 10:
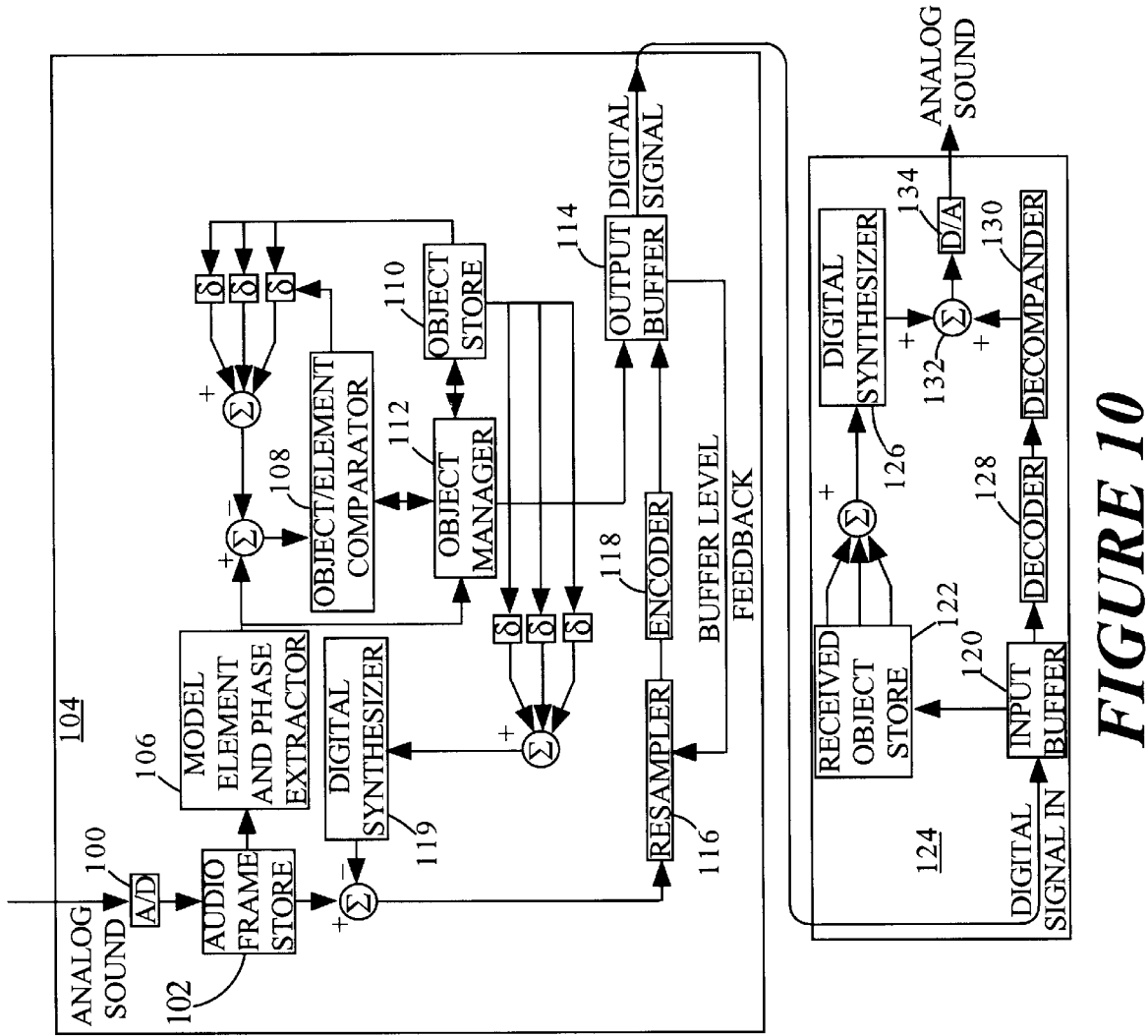
FIG. 10 is a block diagram of an audio transmitter/receiver system of an embodiment of the invention.

With reference to FIG. 10, the encoding of an analog audio signal using a simple tone based model is initiated by applying the analog signal to an analog to digital (A/D) converter 100 in a transmitter 104 to produce a digital signal. The digital signal is then applied from the A/D converter 100 to an AUDIO FRAME STORE 102 for storage in memory. A frame's worth of the digital signal is sent from the AUDIO FRAME STORE 102 to a MODEL ELEMENT AND PHASE EXTRACTOR (MEPE) 106 for determination of the parameters which best describe subintervals of the present frame. The remaining explanation assumes a model having amplitude, frequency, dispersion, duration, and phase parameters; however other models may be used.

In determining object parameters, the MEPE 106 first identifies for a subinterval of the frame, the frequency interval with the largest amplitude. The MERE then identifies monotonically lower-amplitude adjacent intervals and determines their respective absolute amplitudes to build a collection of contiguous frequency intervals. The determination of center and range parameters, as well as the amplitude parameters for the frequency intervals is made using a standard gaussian shape model. Each set of such parameters is compared with the parameter sets in adjacent subintervals of the frame to determine start times, duration, and phase.

The center, range, start time, duration, phase and amplitude parameters determined by the MEPE 106 are received by an OBJECT MANAGER 112 and applied to select or extend a wave form (an object) previously stored in an OBJECT STORE 110 to generate an object, or model wave of she signal, in the present frame. The model wave of the signal and the actual signal may then be compared by an OBJECT/ELEMENT COMPARATOR 108 to determine wave form differences between the two.

Additional objects, which when superimposed with the first determined object will better approximate the original signal, may then be determined using the wave form differences. The determination of additional objects is accomplished by determining the parameters which describe the wave form differences wave form. The process of determining additional objects may be repeated a predetermined number of times or until the highest peak in a wave form differences wave form is lower than some preset value. The set of parameters for each object in the frame is sent by the OBJECT MANAGER 108 to an OUTPUT BUFFER 114 for transmission to a receiver 124.

The OBJECT MANAGER 108 may also update the OBJECT STORE 110 by storing new versions of the objects in the OBJECT STORE. The new versions of the objects may be generated by applying a set of newly determined object parameters to a corresponding previously stored object.

It is assumed that the audio information in a given frame is seldom or never precisely reproduced by the use of the object parameters. In order to improve the net fidelity of the encoding, the difference between the uncompressed digital data stored in the AUDIO FRAME STORE 102, which represents the audio signal in full, and the synthesized resultant of all current objects is sent through a RESAMPLER 116 to an ENCODER 118 for transmission to the receiver 124. The RESAMPLER and the ENCODER compress the residual (unexplained) signal in concert using one or more standard techniques so as to make maximum use of available bandwidth.

The audio receiver 124 operates similarly to the video receiver previously described, in that sets of parameters which describe the change to an object are received by an INPUT BUFFER 120 and applied therefrom to a RECEIVED OBJECT STORE 122. The RECEIVED OBJECT STORE 122 has stored therein objects from previous frames to which the sets of parameters correspond. The RECEIVED OBJECT STORE 122 applies a parameter set to its corresponding object to reconstruct the object in the present frame. The collection of reconstructed objects may be integrated into a single wave form at a DIGITAL SYNTHESIZER 126 to reproduce a digital approximation of the original analog signal.

Additional digital data, derived in the transmitter by resampling and encoding audio from which the object-based resultant has been subtracted, is recreated by a DECODER 128, and a DECOMPANDER 130, which reverses the resampling and encoding. The summer 132 adds the difference data and the synthesized resultant of the objects present in the frame. A digital to analog converter 134 then converts the combined data to an analog signal.

Figure 11:
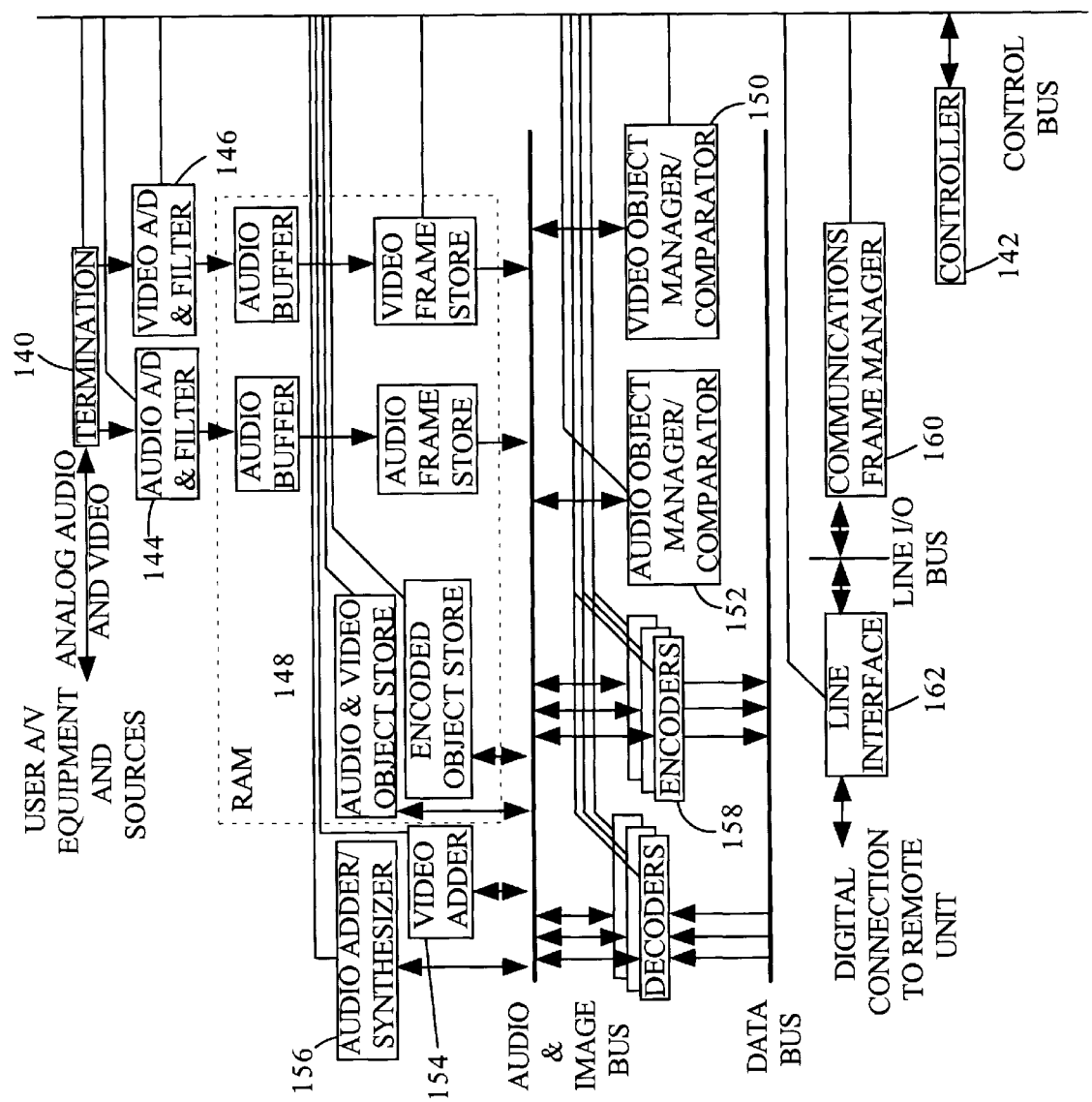
FIG. 11 is a block diagram of an audio/video transmitter of an embodiment of the invention.

With reference to FIG. 11 a transmitter/encoder for both audio and video information is shown. The device may be housed in a standard cardcage chassis with multiple printed circuit boards and connectors, a power source and cooling fans. The printed circuit boards are interconnected by groups of circuit lines (buses) common to multiple boards.

In the operation of the transmitter/encoder, signals from user audio/video equipment (e.g. cameras and microphones) are connected physically and electrically to a TERMINATION 140. Under the control of a CONTROLLER 142, implemented by a digital processor, incoming analog signals are filtered, preprocessed, sampled and digitized by an AUDIO A/D AND FILTER 144 and a VIDEO A/D AND FILTER 146, and thereafter applied to an AUDIO BUFFER and a VIDEO BUFFER in a RAM 148 for accumulation and temporary storage.

The RAM 148 also comprises an AUDIO FRAME STORE which holds in random access storage one or more frames made up of multiple time slices of the incoming digitized signal and acquired from the AUDIO BUFFER. A VIDEO FRAME STORE in the RAM 148 holds one or more video frames in random access storage, each made up of a rectangular array of luminance and chrominance values for individual frame pels.

A VIDEO OBJECT MANAGER/COMPARATOR 150, implemented in multiple parallel processors or other means, creates, deletes, changes and manages video objects and compares existing video objects with portions of one or more current frames under the allowed combinations of displacement/delay, rotation, luminance change, and other object transformations.

An AUDIO OBJECT MANAGER/COMPARATOR 152 provides in a processor and associated memory, the functions of the MODEL ELEMENT AND PHASE EXTRACTOR 106 of FIG. 10 to determine model elements and phase as well as the functions of the OBJECT MANAGER 112 and OBJECT/ELEMENT COMPARATOR 108 to compare successive frames and compress repetitions among model elements.

The functions of a VIDEO ADDER 154 and an AUDIO ADDER/SYNTHESIZER 156, implemented in digital logic, correspond to those of the summation and differencing devices in FIGS. 3 and 10 and the DIGITAL SYNTHESIZER 119 in FIG. 10.

The processor-based ENCODERS 158 provide the OBJECT ENCODER and PARAMETRIC ENCODER computation functions of FIG. 3, as well as the RESAMPLER and ENCODER functions of FIG. 10.

The objects comprising the representation of audio and video frames are held in random access memory RAM 148 in an AUDIO AND VIDEO OBJECT STORE and, in encoded form, in an ENCODED OBJECT STORE.

A COMMUNICATIONS FRAME MANAGER 160 handles the electronic framing of the output signal (corresponding to OUTPUT BUFFER and CHANNEL ENCODER functions in FIG. 3).

A LINE INTERFACE 162 corresponds to SIGNAL OUT data path in FIG. 10 and may provide multiple synchronous or asynchronous data formats under processor control.

Figure 12:
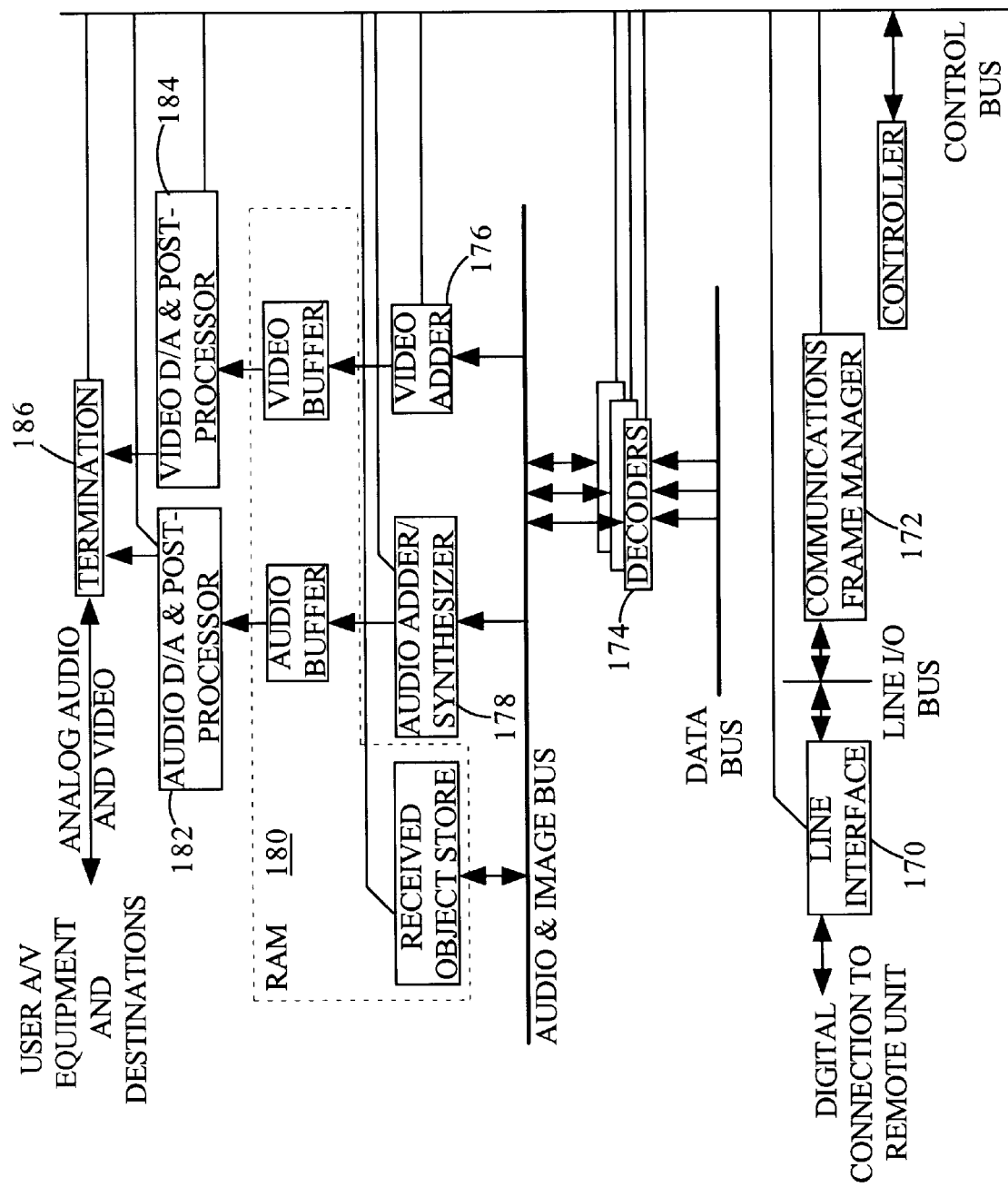
FIG. 12 is a block diagram of an audio/video receiver of an embodiment of the invention.

FIG. 12 shows a receiver/decoder for both audio and video information. Like the transmitter/encoder shown in FIG. 11, the device may be housed in a standard cardcage chassis with multiple printed circuit boards and connectors, a power source and cooling fans.

In the receiver/decoder a LINE INTERFACE 170 corresponds to the SIGNAL IN data path in the receiver 41 in FIG. 3. The LINE INTERFACE 170 may provide multiple synchronous or asynchronous data formats under processor control. A COMMUNICATIONS FRAME MANAGER 172 removes the communications channel signal framing.

Processor-based DECODERS 174 provide the OBJECT DECODER and PARAMETRIC DECODER computation functions in the receiver 41 of FIG. 3, as well as the DECODER and DECOMPANDER functions of the receiver 124 of FIG. 10.

The functions of a VIDEO ADDER 176 and an AUDIO ADDER/SYNTHESIZER 178, implemented in digital logic, correspond to those of the summation and differencing devices in the receivers 41 and 124, of FIGS. 3 and 10 respectively, as well as to the DIGITAL SYNTHESIZER 126 in FIG. 10.

A RAM 180 comprises an AUDIO BUFFER which holds one or more frames of audio for post processing and conversion to analog audio in an AUDIO D/A & POST PROCESSOR 182. The RAM 180 also comprises a VIDEO BUFFER which holds one or more video frames of pel luminance and chrominance values for post processing and conversion to analog video in a VIDEO D/A & POST PROCESSOR 184.

A TERMINATION 186 provides a physical and electrical connection between the receiver/decoder and user audio/video equipment (e.g., video monitors and audio speakers) which correspond to the VIDEO OUT in FIG. 3 and the ANALOG SOUND output in FIG. 10.

Figure 13:
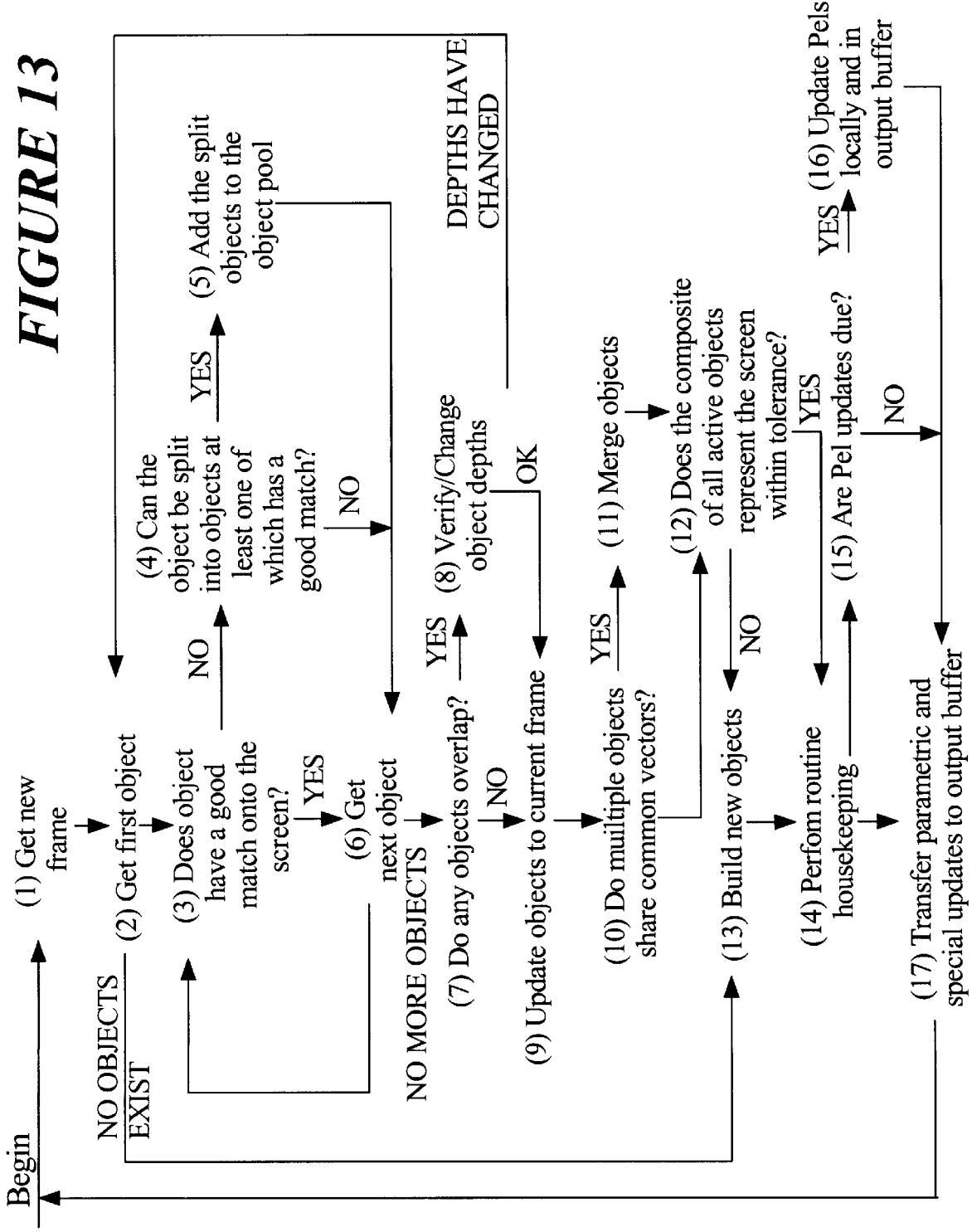
FIG. 13 is a flow diagram of the decision steps for a method embodiment of the invention relating to video encoding and transmission.

FIG. 13 shows a flow diagram of the decisional steps for an embodiment of the invention related to the encoding of video information.

FIG. 14 shows a flow diagram of the decisional steps for an embodiment of the invention related to the encoding of audio information.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. In a system for communicating plural frames of information, each frame representing the state of the information during a respective one of a sequence of time periods, said information comprising a plurality of data values, a method of transmitting the information from a transmitter to a receiver comprising the steps of:

(a) identifying within the information at the transmitter one or more objects, each object defined independently of a current frame such that said objects may be larger than or not contained within said current frame, and each object defined by a subset of substantially all the data values in said current frame which, (I) have not changed substantially between the current frame and plural prior frames, and (ii) have changed collectively as a subset relative to a former one of the plural prior frames;

(b) determining for each object the change between at least two of the frames in the relationship of the object to the frames comprising the steps of:

(b)(1) determining the value of a characteristic of an object in each of at least two frames, said characteristic having terms;

(b)(2) estimating the value of said characteristic in one of said two frames by assuming the change in the terms of said characteristic and combining the assumed change with the determined value of the other of said two frames;

(b)(3) determining the difference between said estimated value of said characteristic in said one frame and the determined value of said characteristic in said one frame; and, (b)(4) repeating steps (b)(2) and (b)(3) until the earlier of: (I) determining the assumed change producing the smallest determined difference, said determined difference being within a predetermined acceptance condition; and, (ii) a predetermined ending condition is satisfied;

(c) transmitting for each object an identification of the object and said determined change; and (d) reconstructing at the receiver the objects in one of the frames from the identifications and the determined changes.

2. The method of claim 1 further comprising the steps of:

(b)(5) transmitting the information corresponding to objects for which the predetermined ending condition is satisfied; and (b)(6) storing said information in memory at the transmitter and at the receiver as objects to be identified in future frames.

3. In a system for communicating plural frames of information, each frame representing the state of the information during a respective one of a sequence of time periods, said information comprising a plurality of data values a method of transmitting the information from a transmitter to a receiver comprising the steps of:

(a) identifying within the information at the transmitter one or more objects, each object defined independently of a current frame such that said objects may be larger than or not contained within said current frame, and each object defined by a subset of substantially all the data values in said current frame which, (I) have not changed substantially between the current frame and plural prior frames, and (ii) have changed collectively as a subset relative to a former one of the plural prior frames;

(b) determining for each object the change between at least two of the frames in the relationship of the object to the frames;

(c) transmitting for each object an identification of the object and said determined change wherein descriptions of all possible objects in any frame are permanently stored at the receiver and only the object identifications and the determined relationships are transmitted from the transmitter to the receiver; and (d) reconstructing at the receiver the objects in one of the frames from the identifications and the determined changes.

4. In a system for communicating plural frames of information, each frame representing the state of the information during a respective one of a sequence of time periods, said information comprising a plurality of data values, a method of transmitting the information from a transmitter to a receiver comprising the steps of:

(a) identifying within the information at the transmitter one or more objects, each object defined independently of a current frame such that said objects may be larger than or not contained within said current frame, and each object defined by a subset of substantially all the data values in said current frame which, (I) have not changed substantially between the current frame and plural prior frames, and (ii) have changed collectively as a subset relative to a former one of the plural prior frames;

(b) determining for each object the change between at least two of the frames in the relationship of the object to the frames comprising the steps of:

(b)(1) determining an approximate description of the change to an object between two of the frames;

(b)(2) determining whether the approximate description accurately describes the change to each element of the object between the two frames;

(b)(2)(I) comparing the elements as changed by the approximate description with the elements as actually changed between the frames; and (b) (3) defining said determined change by said approximate description for those objects having a predetermined number of elements for which the approximate description accurately describes the change to the elements, (c) transmitting for each object an identification of the object and said determined change; and (d) reconstructing at the receiver the objects in one of the frames from the identifications and the determined changes.

5. The method of claim 4 further comprising the steps of:

(b) (2) (ii) determining difference information from the comparison of step (b) (2) (i); and (c) (1) transmitting said difference information to the receiver for use in reconstructing an object in one of the frames.

6. In a system for communicating plural frames of information, each frame representing the state of the information during a respective one of a sequence of time periods, said information comprising a plurality of data values, a method of transmitting the information from a transmitter to a receiver comprising the steps of:

(a) identifying within the information at the transmitter one or more objects, each object defined independently of a current frame such that said objects may be larger than or not contained within said current frame, and each object defined by a subset of substantially all the data values in said current frame which, (I) have not changed substantially between the current frame and plural prior frames, and (ii) have changed collectively as a subset relative to a former one of the plural prior frames;

(b) determining for each object the change between at least two of the frames in the relationship of the object to the frames;

(c) transmitting for each object an identification of the object and said determined change;

(d) reconstructing at the receiver the objects in one of the frames from the identifications and the determined changes; and (e) selectively storing in memory at the transmitter and at the receiver the information corresponding to each identified object.

7. The method of claim 6 further comprising the step of:

(f) deleting from said memory the information corresponding to objects which are absent from a predetermined number of consecutive frames.

8. The method of claim 7 further comprising the step of:

(g) merging two or more objects of a single frame that have corresponding determined changes, into one object.

9. In a system for communicating plural frames of image data, each frame representing the state of the image data during a respective one of a sequence of time periods, said image data comprising a plurality of data values a method of transmitting the image data from a transmitter to a receiver comprising the steps of:
  (a) identifying within the image data at the transmitter one or more objects, each object defined independently of a current frame such that said objects may be larger than or not contained within said current frame, and each object defined by a subset of substantially all the data values in said current frame which, (I) have not changed substantially between the current frame and plural prior frames, and (ii) have changed collectively as a subset relative to a former one of the plural prior frames;
  (b) determining for each object the change between at least two of the frames in the relationship of the object to the frames comprising the steps of:
    (b)(1) determining position changes of the objects in the frame; and
    (b)(2) determining depth placement changes of the objects in the frame relative to the other objects in the frame comprising the steps of;
    (b)(2)(I) determining the displacement of the objects;
    (b)(2)(ii) determining the pivot of the objects;
    (b)(2)(iii) determining the rotation of the objects; and
    (b)(2)(iv) determining the differential approach of the objects;
  © transmitting for each object an identification of the object and said determined change; and
  (d) reconstructing at the receiver the objects in one of the frames from the identifications and the determined changes.

10. In a system for communicating plural frames of image data, each frame representing the state of the image data during a respective one of a sequence of time periods, said image data comprising a plurality of data values, a method of transmitting the image data from a transmitter to a receiver comprising the steps of:
  (a) identifying within the image data at the transmitter one or more objects, each object defined independently of a current frame such that said objects may be larger than or not contained within said current frame, and each object defined by a subset of substantially all the data values in said current frame which, (I) have not changed substantially between the current frame and plural prior frames. and (ii) have changed collectively as a subset relative to a former one of the plural prior frames;
  (b) determining for each object the change between at least two of the frames in the relationship of the object to the frames comprising the steps of:
    (b)(1) determining position changes of the objects in the frame; and
    (b)(2) determining depth placement changes of the objects in the frame relative to the other objects in the frame;
    (b)(3) determining the luminance of the objects in the frame; and
    (b)(4) determining the chrominance of the objects in the frame;
  © transmitting for each object an identification of the object and said determined change; and
  (d) reconstructing at the receiver the objects in one of the frames from the identifications and the determined changes.

11. In a system for communicating plural frames of audio data, each frame representing the state of the audio data during a respective one of a sequence of time periods, said audio data comprising a plurality of data values a method of transmitting the audio data from a transmitter to a receiver comprising the steps of:
  (a) identifying within the audio data at the transmitter one or more objects, each object defined independently of a current frame such that said objects may be larger than or not contained within said current frame, and each object defined by a subset of substantially all the data values in said current frame which, (I) have not changed substantially between the current frame and plural prior frames, and (ii) have changed collectively as a subset relative to a former one of the plural prior frames;
  (b) determining for each object the change between at least two of the frames in the relationship of the object to the frames
  © transmitting for each object an identification of the object and said determined change; and
  (d) reconstructing at the receiver the objects in one of the frames from the identifications and the determined changes.

12. The method of claim 11 wherein the objects comprise digitally represented wave forms.

13. The method of claim 11 wherein the step of determining the change in the relationship of an object to the frames further comprises the step of:
  (b)(1) determining object amplitude, frequency, dispersion, and phase parameters.

14. The method of claim 13 wherein the step of determining the change in the relationship of an object to the frames further comprises the step of:
  (b)(2) determining object duration, attack time, and decay time parameters.

15. The method of claim 13 wherein the step of determining the change in the relationship of an object to the frames further comprises the step of:
  (b)(3) determining first, second, and third response filter frequency and relative amplitude parameters.

16. In a system for communicating plural frames of audio information, each frame representing a separate audio signal existing during one of a sequence of time periods, each audio signal defined independently of said frames such that said audio signals may be larger than or not fully contained within a current frame, a method of transmitting the frames of audio information from a transmitter to a receiver comprising the steps of:
  (a) converting an analog audio signal to a digital audio signal;
  (b) determining content elements of the digital audio signal;
  (c) determining object parameters which relate said content elements to a model of the digital audio signal;
  (d) determining the differences between the digital audio signal and said model of the digital audio signal; and
  (e) transmitting said content elements, said parameters, and said differences from a transmitter to a receiver.

17. The method of claim 16 further comprising the step of:
  (d)(1) iteratively repeating steps (c)–(d), wherein object parameters are determined for said determined differences, until said determined differences are less than a preset value.

18. The method of claim 16 further comprising the steps of:

(f) receiving said content elements, said parameters, and said differences at the receiver;

(g) reconstructing said digital audio signal from said content elements, said parameters, and said differences; and (h) converting said digital audio signal to an analog audio signal.

19. A system for communicating plural frames of image information, each frame representing a separate image, each said separate image defined independently of a current frame such that said separate images may be larger or not contained within said current frame, each said separate image existing during one of a sequence of time periods comprising:

transmitter means comprising:

means for receiving and storing the frames of image information during successive time periods;

means for identifying, within stored frames of image information, objects which are present in at least two of the prior frames, each said object defined by a subset of substantially all the pels in a frame which, (I) have not substantially changed position relative to each other between two frames, and (ii) have collectively changed position as a subset relative to a former one of the two frames;

means for determining for each object a change between at least two frames in the relationship of the object to the frames so as to precisely construct each object in the later of the two frames comprising:

means for determining an approximate change in the relationship of the objects; and means for determining the accuracy of the approximate change in the relationship of the objects, comprising:

means for comparing pel luminances; and means for comparing pel chrominances; and means for transmitting, for each object, the object identification and the change in the relationship of the object to the frames.

20. A system for communicating plural frames of image information, each frame representing a separate image, each said separate image defined independently of a current frame such that said separate images may be larger or not contained within said current frame, each said separate image existing during one of a sequence of time periods comprising:

a transmitter means comprising:

means for receiving and storing the frames of image information during successive time periods;

means for identifying within stored frames of image information objects which are present in at least two of the prior frames, each said object defined by a subset of substantially all the pels in a frame which, (I) have not substantially changed position relative to each other between two frames, and (ii) have collectively changed position as a subset relative to a former one of the two frames;

means for determining for each object a change between at least two frames in the relationship of the object to the frames so as to precisely construct each object in the later of the two frames, wherein the change in the relationship of the objects includes change in object position, change in object size, and change in object depth placement; and means for transmitting, for each object, the object identification and the change in the relationship of the object to the frames.

21. A system for communicating plural frames of audio information, each frame representing a separate audio signal, each said separate audio signal defined independently of a current frame such that said separate audio signal may be larger than or not contained within a current frame, each said separate audio signal existing during one of a sequence of time periods comprising:

a transmitter comprising:

means for converting an analog audio signal to a digital audio signal;

means for determining content elements of the digital audio signal;

means for determining parameters representing the relationship of said content elements to a model of the digital audio signal;

means for determining the differences between the digital audio signal and said model of the digital audio signal; and means for transmitting said content elements, said parameters, and said differences.

22. The system of claim 21 further comprising:.

a receiver comprising:

means for receiving said content elements, said parameters, and said differences;

means for reconstructing said digital audio signal from said content elements, said parameters, and said differences; and means for converting said digital audio signal to an analog audio signal.

* * * * *